United States Patent [19]
Lamb et al.

[11] Patent Number: 5,443,360
[45] Date of Patent: Aug. 22, 1995

[54] METHOD AND APPARATUS FOR TRANSFERRING HOLLOW PLASTIC ARTICLES

[75] Inventors: Douglas Lamb, Toronto; Gordon Elliott, Islington, both of Canada

[73] Assignee: Husky Injection Molding Systems Ltd., Bolton, Canada

[21] Appl. No.: 332,350

[22] Filed: Oct. 31, 1994

Related U.S. Application Data

[63] Continuation of Ser. No. 957,888, Oct. 8, 1992, abandoned.

[51] Int. Cl.$^6$ .............................................. B65G 47/30
[52] U.S. Cl. ................................... 414/799; 198/431; 198/434
[58] Field of Search ................... 198/431, 434; 414/799

[56] References Cited

U.S. PATENT DOCUMENTS

| | | | |
|---|---|---|---|
| 3,324,987 | 6/1967 | Kiesser | 198/431 |
| 4,444,423 | 4/1984 | Montferme et al. | 198/434 |
| 4,684,008 | 8/1987 | Hayashi et al. | 198/431 |
| 4,917,230 | 4/1990 | Barchman | 198/434 |
| 5,101,957 | 4/1992 | Schiek | 198/431 |

Primary Examiner—Michael S. Huppert
Assistant Examiner—Gregory A. Morse
Attorney, Agent, or Firm—Bachman & LaPointe

[57] ABSTRACT

A method for continuous transferring of hollow plastic articles from a first station to a second station, wherein articles at the first station are arranged in a first number of $N_1$ columns and wherein articles at the second station are arranged in a second number of $N_2$ columns, and wherein $N_2$ differs from $N_1$ and equals $N_1$ times x, x being either an integer greater than 1 or a fraction, includes the steps of: transferring a first batch of articles on a carrying member from the first station to an array of $N_2$ columns on the holding member at the second station; advancing at least a portion of the articles on a first number of holding members from the second station toward the blow molding station and replacing the advanced first number of holding members with a corresponding second number of holding members; transferring a second batch of articles on the carrying member from the first station to an array of $N_2$ columns on the holding member of the second station, including at least the second number of holding members; and advancing at least a portion of the articles on the second number of holding members from the second station toward the blow molding station.

24 Claims, 6 Drawing Sheets

FIG-5

METHOD AND APPARATUS FOR TRANSFERRING HOLLOW PLASTIC ARTICLES

This is a Continuation of application Ser. No. 07/957,888, filed Oct. 8, 1992 now abandoned.

BACKGROUND OF THE INVENTION

1. Field of the Invention

The invention relates to the art of injection molding hollow plastic articles, especially hollow plastic articles which are to be blow molded into containers and, more particularly, to a method and apparatus for transferring hollow plastic articles from an injection molding station to a blow molding station.

2. Description of the Related Art

Numerous methods are known for the transfer of parisons or preforms from an injection molding station to a blow molding station.

One of the primary concerns in transferring such articles is providing efficient use of both the injection molding machine and the blow molding machine. The injection molding process differs from the blow molding process, particularly in the time needed to complete each process. Thus, one station frequently must wait for the other and, therefore, operates in an inefficient manner.

U.S. Pat. Nos. 4,690,633 to Schad and 4,140,464 to Spurr are examples of prior art methods for preparing articles involving a transfer of the articles from an injection molding station to a blow molding station. In both cases, all the preforms molded in one molding cycle of the injection molding station are unloaded and transferred "en masse" to the next station. Such "en masse" transfer of preforms generally results in either a backlog of preforms at the blow molding station, or inefficient use of the blow molding station due to periods of delay or slow operation while waiting for a new batch of preforms to be delivered from the injection molding station.

Another method for transferring preforms is shown in U.S. Pat. No. Re. 33,237 to Delfer, which deals with a carrier plate cooperating with an injection molding machine.

A method of altering the spacing between the parts removed by a robot's tooling plate is disclosed in U.S. Pat. No. 4,814,134 to Brown.

It is the principal object of the present invention to provide a novel method and apparatus for unloading preforms from a mold to a receiving station for conveyance to a blow molding machine.

It is another object of the present invention to provide such a method and apparatus wherein robot tooling need not necessarily be equipped to change spacing of preforms or articles being transferred, thereby simplifying the robot tooling and reducing its weight and cost.

It is still another object of the present invention to provide such a method and apparatus having great flexibility so as to accommodate many differing configurations of preform injection mold cavity number and layout, blow mold cavity number and layout and a variety of pallet configurations.

Other objects and advantages will become apparent to those skilled in the art upon a consideration of the following disclosure.

SUMMARY OF THE INVENTION

The foregoing objects and advantages are readily obtained by the method and apparatus of the present invention.

The method for continuous transfer of hollow plastic articles, according to the invention, is directed to the transfer of such articles from a first station to a second station for transfer to a blow molding station, wherein said articles at said first station are arranged in a first number of $N_1$ columns and wherein said articles at said second station are arranged in a second number of $N_2$ columns, and wherein $N_2$ differs from $N_1$ and equals $N_1$ times x, and wherein x is a number.

According to the invention, the method comprises the steps of: transferring a first batch of articles on a carrying means from said first station to an array of $N_2$ columns on said holding means at said second station; advancing at least a portion of said articles on a first number of holding means from said second station toward said blow molding station and replacing the advanced first number of holding means with a corresponding second number of holding means; transferring a second batch of articles on said carrying means from said first station to an array of $N_2$ columns on said holding means at said second station, including at least said second number of holding means; and advancing at least a portion of said articles on said second number of holding means from said second station toward said blow molding station.

According to the invention, x is preferably either an integer greater than 1 or a fraction.

According to one preferred embodiment of the invention, x equals 2. Of course, other configurations are possible and even expected. The method of the present invention, however, readily applies to such other configurations.

The first station is preferably an injection molding station, having a number of mold cavities arranged in a given layout and number, typically arranged in a number of columns as described above. The second station is preferably a holding means, such as a group of pallets, for carrying articles to a subsequent blow molding station. This station may also preferably serve as a temperature conditioning station for providing preforms or parisons at a temperature for blow molding and axial orientation.

According to the invention, the apparatus for transferring hollow plastic articles comprises: a first station wherein articles are arranged in a first number of $N_1$ columns; a second station wherein articles are arranged in a second number of $N_2$ columns, and wherein $N_2$ differs from $N_1$ and equals $N_1$ times x, wherein x is a number, said second station including holding means for transferring said articles to a blow molding station; and carrying means for cyclically transferring batches of articles from said first station to arrays of $N_2$ columns on said holding means of said second station.

According to the invention, the carrying means is preferably a robot having a tooling plate for carrying batches of articles from the first station to the holding means of the second station.

BRIEF DESCRIPTION OF THE DRAWINGS

A detailed description of the invention follows, with reference to the attached drawings, wherein.

DESCRIPTION OF THE PREFERRED EMBODIMENTS OF THE INVENTION

Figure 1:
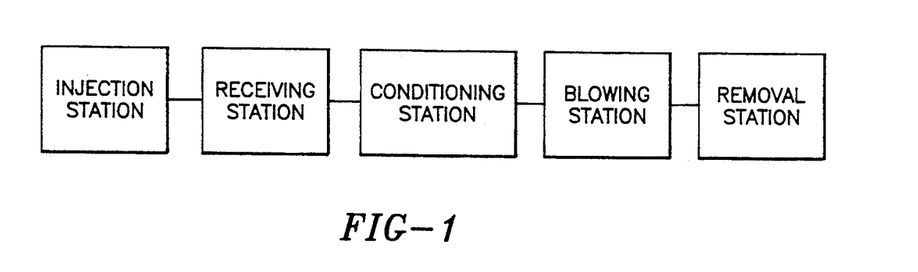
FIG. 1 is a schematic view of a typical series of stations for blow molding hollow plastic articles.

Referring to the drawings, FIG. 1 shows in a block diagram the preferred cycle from injection station where parisons or preforms are prepared, to receiving station where they are transferred to holding means including pallets, preferably by a robot, to a temperature conditioning station where the temperature is adjusted so as to be suitable for blowing and axial orientation, to the blowing station, and finally to the blown article removal station. The cycle is shown in U.S. Pat. No. 4,690,633. The particular features of the overall cycle are not critical to the present invention. Thus, one can readily use an apparatus as shown and described in U.S. Pat. No. 4,690,633. The parisons may or may not be prepared in-line with the other operations and may readily be made at a different time. The transfer path may take the form of an oval path, a straight path, or a horse-shoe shaped path, or any convenient configuration.

The present invention is directed to a method and apparatus for transferring articles, especially parisons, from a first station which may be an injection molding station, to a second station which may be a receiving station or conditioning station, from where the articles are conveyed to a blow molding station to be blown into final form.

Figure 2:
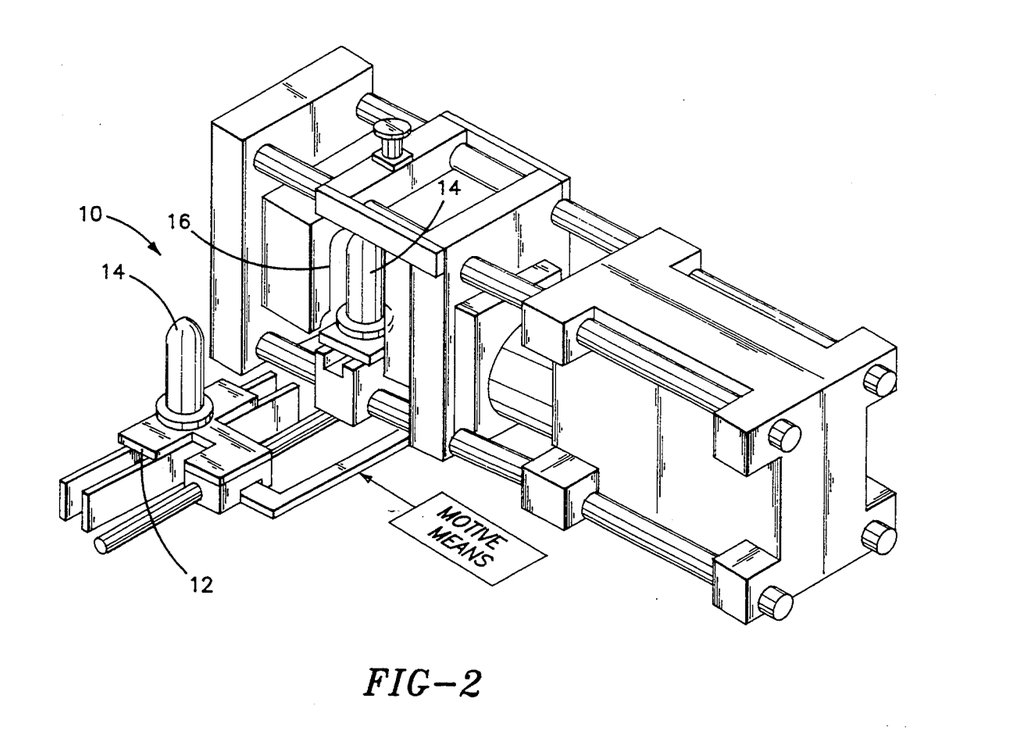
FIG. 2 is an isometric view of a typical blow molding station.

FIG. 2 illustrates a typical blow molding station and is presented to provide a better understanding of the working environment of the invention. FIG. 2 shows an isometric schematic view of a typical blow molding station 10 including holding means 12 with parisons 14 thereon aligned and ready to be received by the blow mold 16. For simplicity, FIG. 2 shows a single holding means 12 carrying a single parison 14; however, it should be understood that the present invention may readily and preferably be used with holding means which carry a plurality of parisons or with a plurality of pallets which carry a plurality of parisons. In the following discussion, the present invention will be described using holding means for carrying a number of parisons.

The present invention, as indicated above, relates to the art of injection molding hollow plastic articles, especially hollow plastic articles which are to be blow molded into containers such as oriented hollow plastic containers.

The present invention is drawn to a method and apparatus for continuous transfer of articles from a first station to a second station, from where the articles are conveyed to the blow molding station.

Articles are transferred from an injection molding station at a first station, to a holding means at a second station for conveying the articles to the subsequent blow molding station. The holding means is preferably a number of pallets being advanced toward the blow molding station. Articles are transported from the injection molding station of the first station to the pallets of the holding means of the second station by carrying means such as a robot tooling plate.

The injection molding and blow molding stations each have cavities for articles which are arranged in differing numbers and layout. Injection molding machines generally operate on a cycle that differs relative to the blow molding cycle, and may have a larger number of mold cavities than the blow molding machine. The articles to be transferred are transferred to holding means, preferably a group of pallets, for transport to the blow molding machine. Each pallet will preferably hold a number of articles corresponding in layout and number to that of the blow molding machine.

Figure 3A:
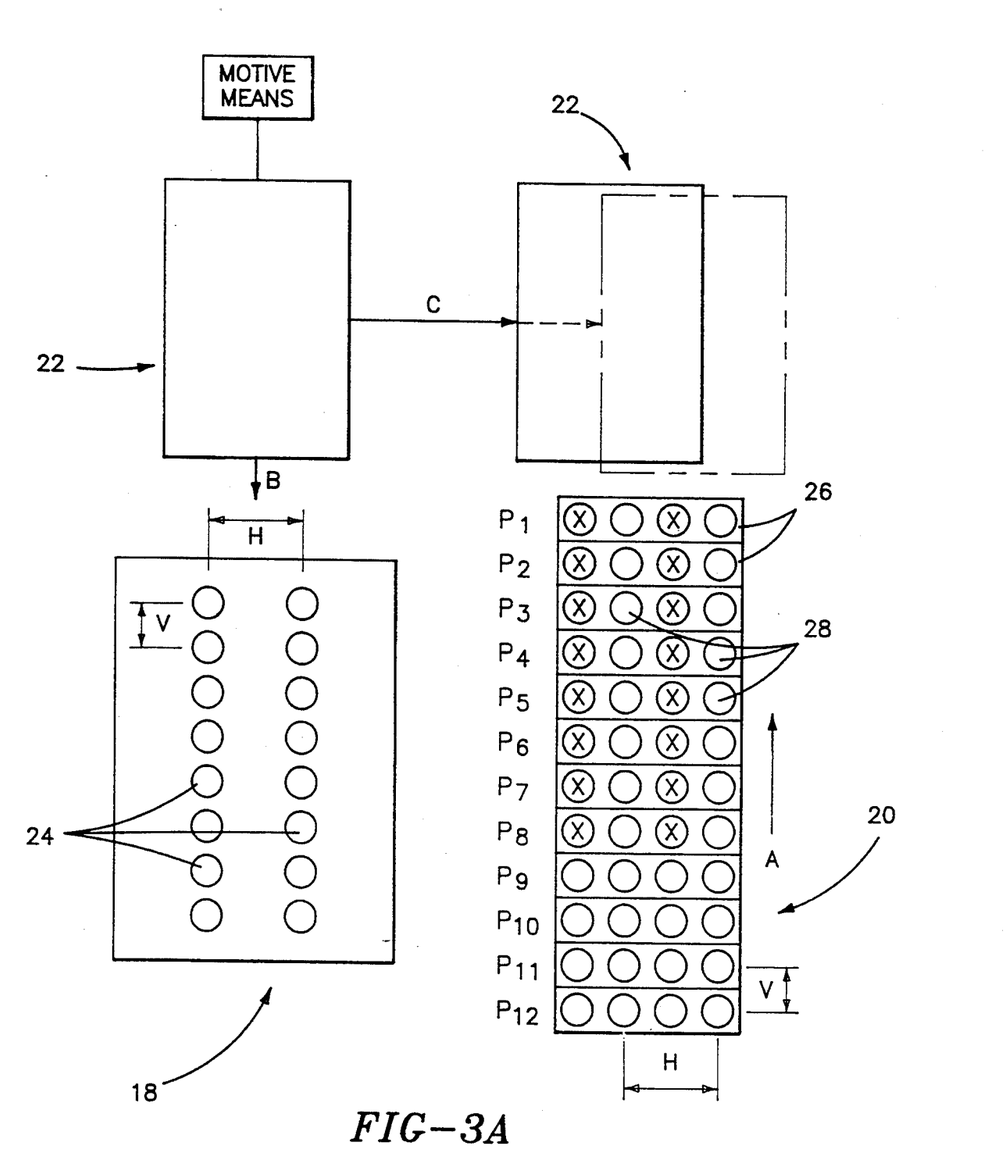
FIGS. 3A–C are schematic views of a preferred embodiment of the invention for use with a 16 cavity injection mold.

Referring now to FIG. 3A, a preferred embodiment of the present invention will be described. FIG. 3A schematically shows a first station 18, a second station 20, and carrying means 22 for transporting articles from first station 18 to second station 20.

First station 18 may preferably be the injection molding plate of an injection molding station. It should be noted, however, that the preforms could be molded in advance or remotely, and sent to the first station at any time. Thus, first station 18 need not necessarily be an injection molding station and could be any convenient station from which articles are to be conveyed to a blow mold. Throughout the specification, the first station 18 will alternatively be referred to as injection molding station 18 and station 18.

In the embodiment of FIG. 3A, first station 18 is an injection molding station at which preforms are molded in a number of columns each having a number of article molding positions 24 as shown in the drawing. The number of columns, referred to herein as $N_2$ columns, will vary with different injection molding stations. The example illustrated in FIG. 3A has 2 columns, each having 8 article molding positions 24. The columns have a lateral spacing H, and article molding positions 24 in each column have a longitudinal spacing V.

According to the invention, second station 20 is a holding means or holding station, preferably comprising a plurality of separate pallets 26, each having a number of holding positions 28 for receiving and holding articles. Second station 20 also preferably includes temperature adjusting means (not shown) to adjust the temperature of parisons so that they have a suitable temperature distribution for blowing and/or orientation at the blow molding station. Throughout the specification, second station 20 will also be referred to as holding means 20 or holding station 20.

The pallets 26 are preferably arranged, according to the invention, in side by side fashion as shown in FIG. 3A. In this manner, holding station 20 presents a number of holding positions 28 for articles arranged in a number of columns. This number of columns is referred to herein as $N_2$ columns.

According to the invention, $N_2$ differs from $N_1$, and $N_2$ is equal to $N_1$ times x, wherein x is a number and is either an integer greater than 1 or a fraction. In the example of FIG. 1, $x=2$, $N_1=2$, and $N_2=4$. That is, the injection molding station of first station 18 has 2 columns, the integer x is 2, and the holding means of second station 20 has 4 columns.

Figure 3B:
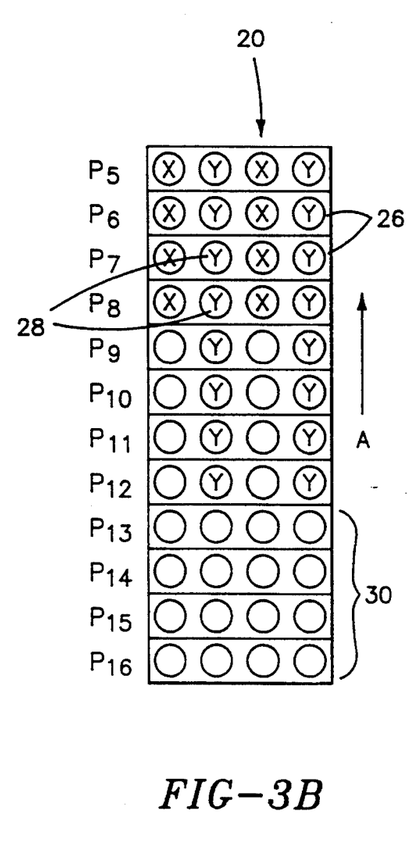
Figure 3C:
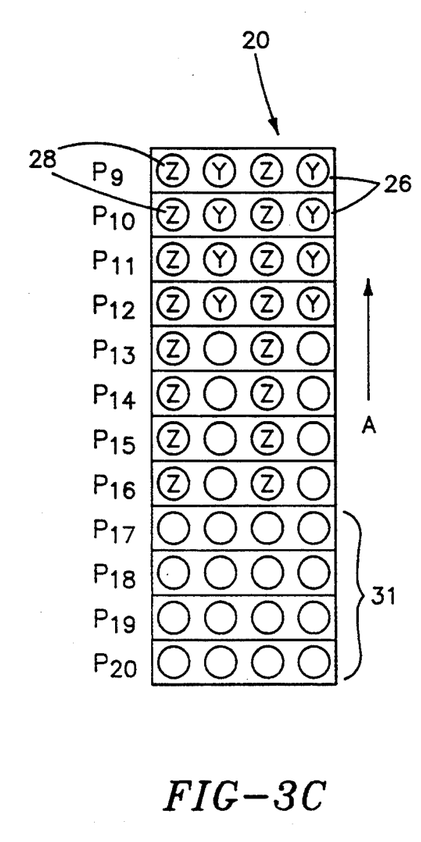

Holding station 20 moves or advances, as in the direction of the arrow A, so as to convey articles to the blow molding station. This direction may for example be substantially parallel to the columns of the holding positions 28. FIGS. 3B and 3C show subsequent stages in the movement of pallets 26 toward the blow molding station in the direction of arrow A.

Each pallet 26 has holding positions 28 preferably corresponding in number to the capacity of the subsequent blow molding station. Holding positions 28 are preferably arranged on pallets 26 so as to have a lateral spacing between adjacent positions of H/x. Thus, if x is 2, the lateral spacing between adjacent positions 28 will be one half of H, and the lateral spacing between alternating holding positions 28 will equal H, i.e., the lateral spacing of articles between alternate holding positions 28 will equal the lateral spacing from the injection molding station 18. The spacing between holding positions 28 in pallets 26 is preferably arranged so as to provide a longitudinal spacing between holding positions 28 corresponding to longitudinal spacing V of articles from injection molding station 18. In this configuration, according to the invention, holding positions 28 of pallets 26 of holding means 20 are arranged so as to provide a number of spaced longitudinal columns of holding positions 28 forming an array or grouping of longitudinal columns, each array having a plurality of holding positions 28 which have a lateral and longitudinal spacing corresponding to that of injection molding station 18. As shown in FIG. 3A, these arrays or groupings of columns are preferably positioned in alternating fashion on holding means 20 so that the first and third columns represent an array which corresponds to station 18 and the second and fourth columns represent an array which also corresponds to station 18. Such an arrangement allows articles to be continuously transported to alternating arrays of positions. This allows both the injection molding station and the blow molding station to be operated efficiently.

According to the invention, articles are transferred from injection molding station 18 to pallets 26 by carrying means 22. Carrying means 22 may suitably be any type of robot tooling plate, or other conventional article conveyance means known in the art which can be adapted so as to position articles in a plurality of positions relative to holding means 20, each position corresponding to an array of columns of holding means 20. Carrying means 22 is thus moved in the direction of arrow B by any convenient motive means into engagement with molding station 18 to move injection molded articles from molding stations 24 and transfer same to a first array (i.e., the first and third columns) of station 20 on a first cycle by movement in the direction of arrow C, and to a second array (i.e., the second and fourth columns) of station 20 on subsequent cycles. Thus, in the example of FIG. 3A, wherein x=2, there are two parallel arrays to which carrying means 22 is positionable, one corresponding to the first and third columns on station 20 and the second corresponding to the second and fourth columns on station 20. FIG. 3A schematically illustrates the positions of carrying means 22 with solid and phantom lines.

FIGS. 3B and 3C show two additional positions of pallets 26 in subsequent stages of operation. FIGS. 3B and 3C show pallets 26 advanced in the direction of the arrows A corresponding to the second and third cycles, respectively, with the position of FIG. 3A being the first cycle. These additional positions of pallets 26 illustrate the placement of articles in alternating parallel arrays, according to the invention. After each cycle, wherein a batch of articles is deposited on pallets 26, pallets 26 are advanced toward the blow molding station by a suitable distance, preferably a distance corresponding to the number of positions contained in a column of articles from the injection molding station 18 divided by x. Thus, in FIG. 1, each column holds 8 articles and x=2, so pallets 26 are advanced a distance corresponding to 4 articles after each batch is unloaded. When pallets 26 are advanced, a new group of empty pallets is supplied for holding means 20, so as to maintain a supply of pallets 26 for receiving articles from carrying means 22. FIG. 3A shows pallets 26 in the illustration of the first cycle, the pallets 26 being consecutively numbered $P_1$ through $P_{12}$. A first batch of articles is transported to pallets 26 and released over one array of columns of holding means 20, i.e., the first and third columns. The articles so released are denoted in FIG. 3A by reference letter X. The pallets 26 are then advanced 4 positions for the second cycle, as shown in FIG. 3B, so that loaded pallets $P_1$ through $P_4$ are removed for transfer to the blow molding station, and a new group 30 of empty pallets, $P_{13}$ through $P_{16}$, are added to holding means 20.

A second batch of articles are then transported from injection molding station 18, positioned over a second array of holding positions 28 of holding means 20, i.e., the second and fourth columns, and released. These articles are denoted in holding means 20 in FIG. 3B as reference letter Y. Holding means 20 is then advanced for the second cycle, another 4 positions, so as to send fully loaded pallets $P_5$ through $P_8$ to the blow molding station, and still another group 31 of empty pallets $P_{17}$ through $P_{20}$ are added as shown in FIG. 3C.

According to the invention, the procedure continues with a third batch of articles being picked up from injection molding station 18 by carrying means 22. In the embodiment of FIGS. 3A–C, there are only two arrays on holding means 20, thus, the third batch is again positioned over the first array, i.e., the first and third columns, and the articles are released. These articles are denoted in the third cycle position of FIG. 3C by reference letter Z. According to the invention, batches of articles are alternatingly, or cyclically, transferred to the arrays of holding means 20 so as to provide a continuous method of transfer of articles.

The rate of advance of pallets 26 may preferably be adjusted so as to synchronize operation of the blow molding station with injection molding station 18. In this regard, the injection molding cycle differs from the blow molding cycle in the amount of time required per cycle. Thus, for example, assuming injection molding station 18 of FIG. 1 could produce one batch of 16 articles every 20 seconds, and a blow mold for such articles could blow 4 articles at a time, then 4 articles must be blown every 5 seconds. Thus, an average of one pallet must be dispatched to the blow molding station every 5 seconds, and 4 pallets must be loaded and dispatched every 20 seconds. Thus, if injection molding station 18 produces A articles per unit time, and the blow molding station can blow B articles per cycle, thus calling for B positions for articles on each pallet 26, then an average of A/B pallets should be advanced per unit time so as to synchronize the blow molding station with injection molding station 18.

The carrying means 22 of the present invention, as previously indicated, may suitably be a robot tooling plate or like structure which can be programmed to transport batches of articles to several different positions relative to holding means 20. Such a robot tooling plate may also include any means known in the art for adjusting lateral and longitudinal spacing of articles as may be necessary from injection molding station 18 to holding means 20, although such means adds to the weight and cost of the robot tooling plate and is, therefore, preferably avoided. Means for altering such spacing are also well known in the teachings of several of the prior patents discussed above.

Figure 4A:
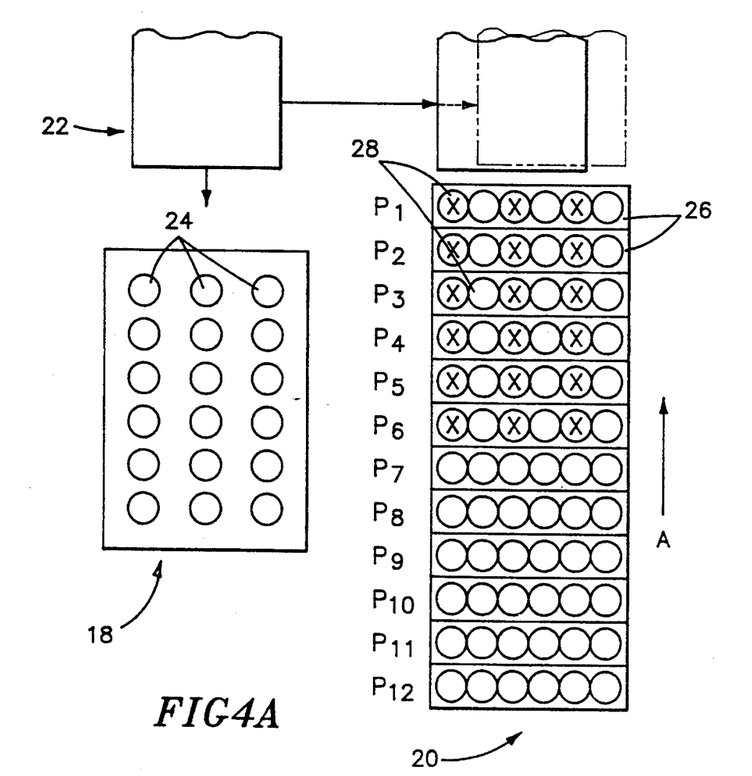
FIGS. 4A–C are schematic views of a preferred embodiment of the invention for use with an 18 cavity injection mold.
Figure 4B:
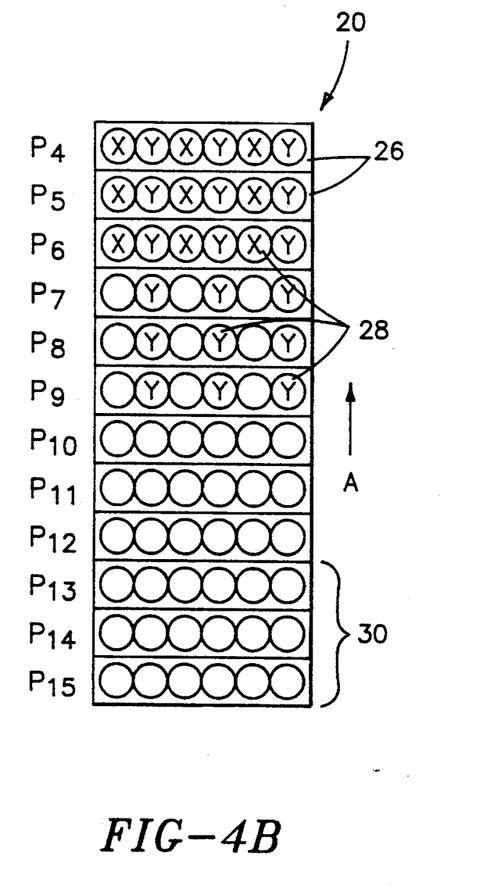
Figure 4C:
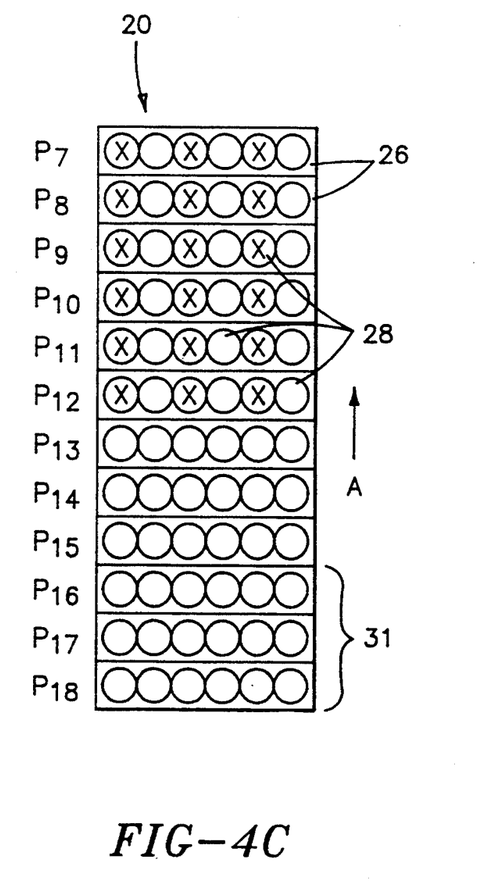

FIGS. 4A-C show a similar embodiment to that of FIGS. 3A-C, with FIG. 4A showing the first cycle of operation, FIG. 4B showing the second cycle of operation and FIG. 4C showing the third cycle of operation. According to the embodiment of FIG. 4A, 18 preforms are molded per cycle, and transferred to pallets 26 each having holding positions 28 for six preforms to be transferred to a six cavity blow molding station. In this embodiment, $N_1 32$ 3, $N_2=6$, and x is again 2. Six articles are located in each column of injection molding station 18. Thus, pallets 26 are advanced three positions in the direction of arrow A after each batch of articles are released. Spacing H and V are arranged in a similar manner to FIG. 3A. Batches are cyclically delivered to alternating positions or arrays, as in FIGS. 3A-C, the successive batches of articles being denoted by reference letters X, Y, and Z.

Figure 5:
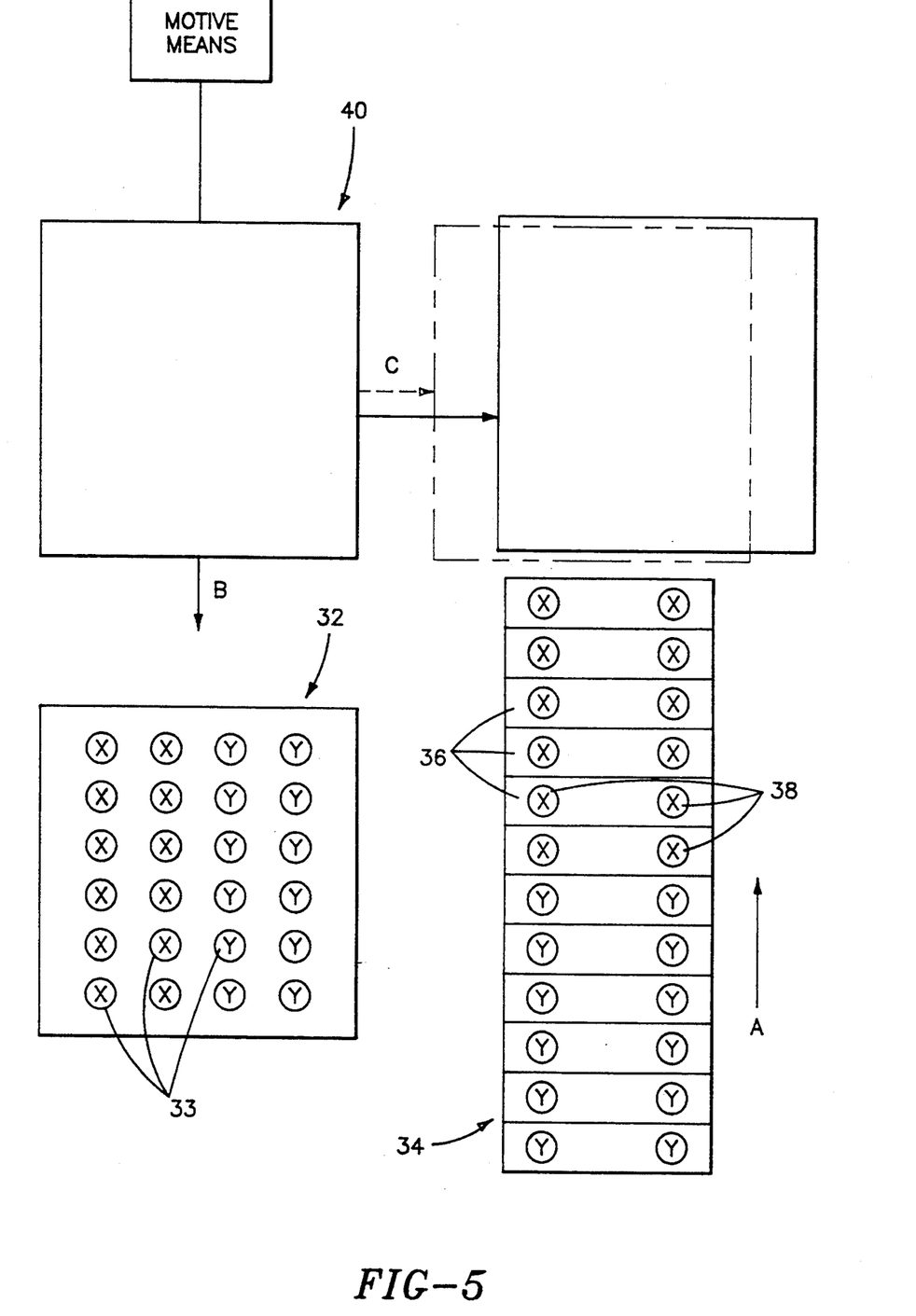
FIG. 5 is a schematic view of an alternate embodiment of the invention for a 24 cavity injection mold.

FIG. 5 illustrates an alternate embodiment of the invention for use in configurations wherein the injection molding station prepares articles in more columns than are present in the holding means of the second station. Such a configuration may be used, for example, when articles are to be blown with a large diameter. Such large diameter articles require a large lateral spacing in the blow molding station to accommodate the large diameter of the expanding articles. The pallets and blow molding station therefore hold less articles. In this situation, according to the invention, the injection station, pallets, and blow molding station are selected so that the injection molding station has a number $N_1$ of columns and the holding station has a number $N_2$ of columns, and wherein, as before, $N_2$ equals $N_1$ times x. Here, however, x is a fraction. The fraction x is preferably the reciprocal of an integer greater than 1. Such a configuration is illustrated in FIG. 5. As shown, first station 32 is an injection molding station wherein $N_1=4$. Each column holds 6 articles in article molding positions 33.

Second station 34 is a holding station comprising a plurality of pallets 36. Pallets 36 collectively have holding positions 38 for articles arranged in $N_2$ columns, $N_2$ being 2 in the embodiment of FIG. 5. Thus, in the embodiment of FIG. 5, $N_2=2$, $N_1=4$, and $x=\frac{1}{2}$.

Carrying means 40 is schematically shown and may be any apparatus known in the art as with carrying means 22 of the embodiments of FIGS. 3 and 4. Note, however, that carrying means 40 may preferably be adapted, also through any conventional means known in the art, to selectively release portions of the total output of injection molding station 32. As with the preferred embodiment of FIGS. 3 and 4, carrying means 40 is adapted so as to be positionable in a number of different positions relative to holding means 34. Preferably, carrying means 40 is positionable to a number of positions with respect to holding means 34, each position aligning a portion of the $N_1$ columns of first station 32 with the $N_2$ columns of holding means 34. These positions of carrying means 40 are schematically illustrated by the solid line and phantom line images of the carrying means 40 of FIG. 5.

The embodiment of FIG. 5 operates as follows. A batch of articles are formed in injection molding station 32, for example in 4 columns of 6 articles each, as shown. These articles are to be transported to holding means 34 which has 2 columns, also as shown. Carrying means 40 grasps the batch of articles and moves to a first position relative to holding means 34 as shown in solid in FIG. 5. A portion of the batch of articles, marked X, are selectively released from carrying means 40. Pallets 36 of holding means 34 are then advanced a number of pallets 36 equal to the number of articles contained in a column of injection molding station 32, thus positioning a new batch of empty pallets relative to carrying means 40. Carrying means 40 is then re-positioned to a second position relative to holding means 34, as shown in phantom in FIG. 5. Another portion of the batch of articles, marked Y, are selectively released from carrying means 40, and pallets 36 are again advanced to bring up empty pallets for receiving a portion of the next batch of articles.

Figure 5A:
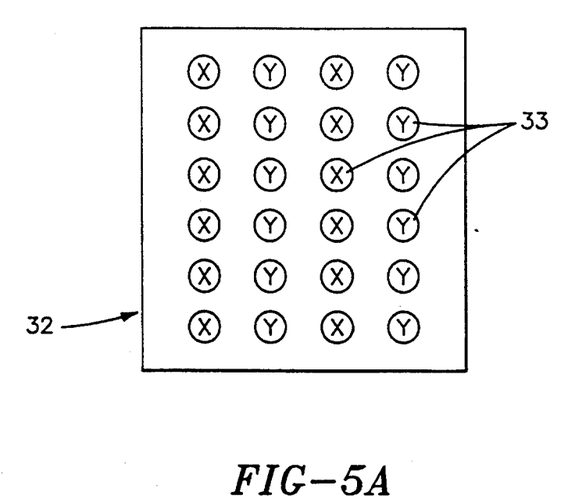
FIG. 5A is an alternate embodiment of the injection molding station of FIG. 5.

It should be noted that changes in lateral spacing of the articles may be necessary in some configurations of injection molding stations and holding stations. For example, the columns of holding means 34 of FIG. 5 are more widely spaced than the columns of injection molding station 32. In this instance, carrying means 40 can be adapted so as to alter the lateral spacing as required. It should be noted further, however, that such a situation could also be remedied, according to the invention, by selectively releasing articles from alternating columns of carrying means 40, as shown in FIG. 5A, so as to more closely align transferred articles with the spacing of holding positions 38 of pallets 36. As shown in FIG. 5A, alternating columns of articles marked by X could be released in the first position, and alternating columns of articles marked Y could be released in the second position, so as to avoid the need for altering the lateral spacing of the articles.

Figure 6:
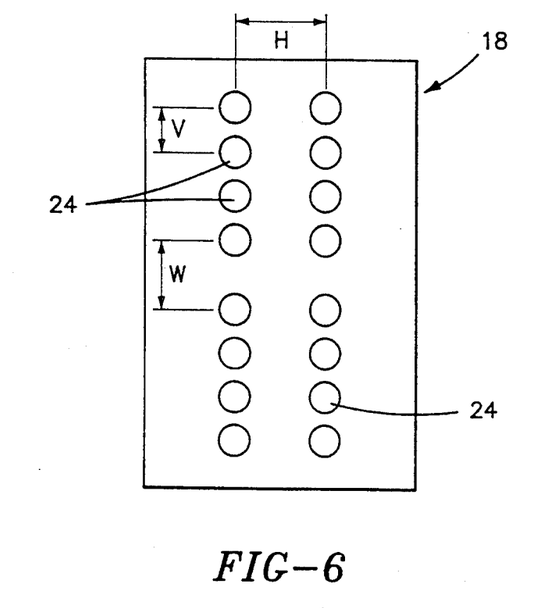
FIG. 6 is an alternate embodiment of the injection molding station of FIG. 3A.

Referring now to FIG. 6, it is common for articles located in columns of an injection molding station 18 or 32 to have longitudinal spacing having one or more larger spaces, denoted as W in the drawing. In this circumstance, carrying means 22 or 40 is preferably adapted so as to reduce longitudinal spacing W so as to coincide with longitudinal spacing V and, accordingly, the spacing between pallets 26 or 36. Such alteration of longitudinal spacing of the articles may be accomplished by means well known in the art.

Thus disclosed is a method and apparatus for transferring articles from an injection molding station to pallets for transport to a blow molding station, which method and apparatus are flexible and able to accommodate numerous different configurations of preform mold cavities, blow mold cavities, and pallets. Modular configurations can be used, according to the invention, to optimize production and output from the injection and blow molding stations.

This invention may be embodied in other forms or carried out in other ways without departing from the spirit or essential characteristics thereof. The presently described embodiments are therefore to be considered as in all respects illustrative and not restrictive, the scope of the invention being indicated by the appended claims, and all changes which come within the meaning and range of equivalency are intended to be embraced therein.

What is claimed is:

1. A method for continuous transfer of articles from a first station to a holding means at a second station for transfer to a final station, which comprises:

providing a plurality of articles at a first station arranged in a first number of $N_1$ columns;

transferring a batch of said articles, wherein said batch includes at least two articles from each of the $N_1$ columns, in a single transfer step on a carrying means from the first station to holding means which form an array of $N_2$ columns at a second station, wherein $N_2$ differs from $N_1$ and equals $N_1$ times a fixed number;

advancing at least a portion of said articles from said transferred batch from said second station to a final station, wherein said portion contains fewer articles than said transferred batch;

transferring a further batch of said articles from each of the $N_1$ columns in a single transfer step on a carrying means from the first station to holding means which form an array of $N_2$ columns at the second station;

advancing a further portion of said articles from the second station to the final station, wherein said portion contains fewer articles than said transferred batch;

including the step of retaining the articles on the holding means after transfer thereto from the carrying means, all the way to the final station;

wherein said first station is an injection molding station which molds A articles per unit time, and wherein said holding means is a plurality of pallets, each holding B articles, the method further including the step of advancing said pallets at a rate corresponding to A/B pallets per unit time so as to synchronize operation of said second station with operation of said first station; and wherein a first batch of articles of the $N_1$ columns of the first station are transferred to a set of columns of the $N_2$ columns of the second station, and then another batch of articles of the $N_1$ columns of the first station are transferred to another set of columns of the $N_2$ columns of the second station after an advanced number of holding means has been replaced.

2. A method according to claim 1 wherein the articles are advanced from said second station directly to said final station.

3. A method according to claim 1 wherein hollow plastic articles are advanced to a blow molding station.

4. A method according to claim 1 wherein a batch of said articles are transferred to a plurality of pallets at said second station, and including the step of retaining the articles on the pallets after transfer thereto from the carrying means, all the way to the final station.

5. A method according to claim 4 wherein a first number of pallets are advanced from said second station in a first cycle, and a second number of pallets are advanced from said second station in a second cycle.

6. A method according to claim 1 wherein said fixed number is an integer greater than 1.

7. A method according to claim 5 wherein said advancing steps include the step of advancing a number of pallets in the first cycle corresponding to the number of articles in a batch divided by the fixed number.

8. A method according to claim 1, further including the steps of:

positioning articles at said first station in columns at a first lateral spacing between said columns; and providing a second lateral spacing between adjacent columns of said holding means, said second lateral spacing being substantially equal to said first lateral spacing divided by said fixed number.

9. A method according to claim 8, further including the steps of:

positioning said articles at said first station at a first longitudinal spacing of said articles in said columns; and providing a second longitudinal spacing of articles in said holding means, said second longitudinal spacing being substantially equal to said first longitudinal spacing.

10. A method for continuous transfer of articles from a first station to a holding means at a second station for transfer to a final station, which comprises:

providing a plurality of articles at a first station arranged in a first number of $N_1$ columns;

transferring a batch of said articles from $N_1$ columns, wherein said batch includes at least two articles from each of the $N_1$ columns transferred, in a single transfer step on a carrying means from the first station to holding means which form an array of $N_2$ columns at a second station, wherein $N_2$ differs from $N_1$ and equals $N_1$ times a fixed number;

advancing at least a portion of said articles from said transferred batch from said second station to a final station;

transferring a further batch of said articles from $N_1$ columns in a single transfer step on a carrying means from the first station to holding means which form an array of $N_2$ columns at the second station;

advancing a further portion of said articles from the second station to the final station;

including the step of retaining the articles on the holding means after transfer thereto from the carrying means, all the way to the final station;

wherein said first station is an injection molding station which molds A articles per unit time, and wherein said holding means is a plurality of pallets, each holding B articles, the method further including the step of advancing said pallets at a rate corresponding to A/B pallets per unit time so as to synchronize operation of said second station with operation of said first station; and wherein a first batch of articles of columns of the $N_1$ columns of the first station are transferred to $N_2$ columns of the second station, and then another batch of articles of columns of the $N_1$ columns of the first station are transferred to $N_2$ columns of the second station after an advanced number of holding means has been replaced.

11. A method according to claim 10, wherein said fixed number is a fraction

12. A method according to claim 11, wherein said batch of articles and said further batch of articles are transferred together on said carrying means from said first station to said holding means of said second station.

13. An apparatus for transferring articles, which comprises:

a first station wherein a plurality of articles are arranged in a first number of $N_1$ columns, wherein said first station is an injection molding station for molding hollow plastic articles;

a second station wherein a plurality of articles are arranged on a holding means in a second number of $N_2$ columns, and wherein $N_2$ differs from $N_1$ and equals $N_1$ times a fixed number, wherein said holding means are a plurality of pallets;

carrying means for cyclically transferring one batch of articles at a time in a single transfer step, wherein each batch includes at least two articles from each of the $N_1$ columns, from the first station to arrays of $N_2$ columns on the holding means at said second station;

means for transferring at least a portion at a time of said articles from said transferred batch from the second station to a final station, wherein said portion contains fewer articles than said transferred batch; and including means for transferring a first batch of articles of the $N_1$ columns of the first station to a set of columns of the $N_2$ columns of the second station and then means for transferring another batch of articles of the $N_1$ columns of the first station to columns of the $N_2$ columns of the second station after a transferred number of holding means has been replaced.

14. An apparatus according to claim 13 wherein said means for transferring is operative to transfer said holding means with articles thereon.

15. An apparatus according to claim 13 wherein said final station is a blow molding station.

16. An apparatus according to claim 13 wherein said fixed number is an integer greater than 1.

17. An apparatus according to claim 13, wherein said first station includes articles positioned in columns at a first lateral spacing between said columns, and wherein said holding means at said second station have adjacent columns with a second lateral spacing between adjacent columns of said holding means, said second lateral spacing being substantially equal to said first lateral spacing divided by said fixed number.

18. An apparatus according to claim 17, wherein said first station includes articles positioned at a first longitudinal spacing of articles in said first station columns, and wherein said holding means have a second longitudinal spacing of articles in said second holding means columns, said second longitudinal spacing being substantially equal to said first longitudinal spacing.

19. An apparatus according to claim 13, wherein said carrying means comprises a robot for carrying articles from said first station to said second station, said robot being positionable, relative to said second station, to a number of arrays of columns of said holding means of said second station.

20. An apparatus according to claim 19, wherein said robot further comprises means for altering longitudinal and lateral spacing of articles to provide for differences in spacing of articles at said first station and spacing of articles at said second station.

21. An apparatus for transferring articles, which comprises:

a first station wherein a plurality of articles are arranged in a first number of $N_1$ columns, wherein said first station is an injection molding station for molding hollow plastic articles;

a second station wherein a plurality of articles are arranged on a holding means in a second number of $N_2$ columns, and wherein $N_2$ differs from $N_1$ and equals $N_1$ times a fixed number, wherein said holding means are a plurality of pallets;

carrying means for cyclically transferring one batch of articles at a time from $N_1$ columns in a single transfer step, wherein each batch includes at least two articles from each of the $N_1$ columns transferred, from the first station to arrays of $N_2$ columns on the holding means at said second station;

means for transferring at least a portion at a time of said articles from said transferred batch from the second station to a final station; and including means for transferring a first batch of articles of columns of the $N_1$ columns of the first station to $N_2$ columns of the second station, and means for then transferring another batch of articles of columns of the $N_1$ columns of the first station to $N_2$ columns of the second station after a transferred number of holding means has been replaced.

22. An apparatus according to claim 21 wherein said means for transferring is operative to transfer said holding means with articles thereon.

23. An apparatus according to claim 21, wherein said fixed number is a fraction.

24. An apparatus according to claim 23, wherein said carrying means further includes means for transporting a plurality of batches at one time to said holding means of said second station.

* * * * *